United States Patent [19]

Yonemitsu et al.

[11] 3,933,941
[45] Jan. 20, 1976

[54] THERMOPLASTIC BLENDED COMPOSITION COMPRISING POLYPHENYLENE ETHER, AROMATIC POLYCARBONATE AND STYRENE RESIN

[75] Inventors: Eiichi Yonemitsu, Kashiwa; Akitoshi Sugio, Tokyo; Masanobu Masu, Tokyo; Masaharu Kimura, Tokyo; Masao Okabe, Tokyo, all of Japan

[73] Assignee: Mitsubishi Gas Chemical Co., Ltd., Japan

[22] Filed: May 1, 1974

[21] Appl. No.: 466,282

Related U.S. Application Data

[63] Continuation-in-part of Ser. No. 269,891, July 7, 1972, abandoned.

[30] Foreign Application Priority Data

| July 9, 1971 | Japan | 46-50248 |
| July 6, 1972 | United Kingdom | 31999/72 |
| July 10, 1972 | Germany | 2233896 |
| July 10, 1972 | France | 72.24957 |
| July 8, 1972 | Italy | 26813/72 |
| July 7, 1972 | Netherlands | 7209516 |
| July 7, 1972 | Belgium | 119624 |
| July 7, 1972 | Canada | 146646 |

[52] U.S. Cl. ....... 260/873; 260/37 PC; 260/45.75 W
[51] Int. Cl.$^2$ ........................................ C08G 39/10
[58] Field of Search ............ 260/873, 47 XA, 47 ET

[56] References Cited
UNITED STATES PATENTS

| 3,221,080 | 11/1965 | Fox | 260/860 |
| 3,383,435 | 5/1968 | Cizek | 260/874 |

*Primary Examiner*—Donald E. Czaja
*Assistant Examiner*—T. Pertilla
*Attorney, Agent, or Firm*—Wenderoth, Lind & Ponack

[57] ABSTRACT

A thermoplastic blended composition comprising 15–80% by weight of polyphenylene ether, 5–60% by weight of a styrene resin and 2–15% by weight of an aromatic polycarbonate. The composition has superior heat resistance, fatigue resistance and processability.

7 Claims, No Drawings

THERMOPLASTIC BLENDED COMPOSITION COMPRISING POLYPHENYLENE ETHER, AROMATIC POLYCARBONATE AND STYRENE RESIN

This application is a continuation-in-part application of our copending application, Ser. No. 269,891, filed July 7, 1972, now abandoned.

This invention relates to a modified polyphenylene ether resin composition having excellent thermal stability, fatigue resistance and processability.

Polyphenylene ether resins are thermoplastic resins having excellent mechanical properties such as tensile strength and electrical properties such as volume inherent resistivity, dielectric constant or dielectric strength and also having a high heat distortion temperature, but have the defect of having poor processability and low resistance to oxidation with heat. In order to remove these defects, it is known to mix polystyrene with polyphenylene ether (see U.S. Pat. Nos. 3,384,682 and 3,383,435).

It has also been attempted to add a polyamide (U.S. Pat. No. 3,379,792) and a polyolefin (U.S. Pat. No. 3,351,851) in order to modify polyphenylene ether, but only a combination of polyphenylene ether and polystyrene is now in commercial use.

This polystyrene-modified polyphenylene ether composition has improved processability at the sacrifice of the high heat distortion temperature possessed by polyphenylene ether, but does not hold a satisfactory level in resistance to fatigue as is required of a commercial-grade resin material. Generally, fatigue resistance is a very important property required of resin materials that are used under repeated mechanical or electrical fatigues such as those used as metal substitutes, electrical component parts, and component parts of precision machinery. Resins having low resistance to fatigue are hardly practical for industrial use.

Accordingly, an object of this invention is to provide a thermoplastic blended composition having improved processability while retaining a feasible level of the high heat distortion temperature of polyphenylene ether.

Another object of this invention is to provide a polyphenylene ether thermoplastic blended composition of improved fatigue resistance which is useful as engineering plastics.

The objects of this invention can be achieved by a thermoplastic blended composition comprising:

1. 15 to 80% by weight of a polyphenylene ether having a polymer unit of the general formula

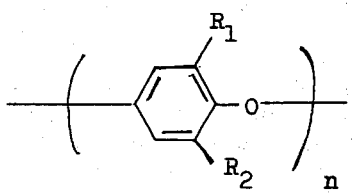

wherein $R_1$ and $R_2$ may be the same or different and represent a methyl or ethyl group, and $n$ is a positive integer of at least 50;

2. 5 to 60% by weight of a styrene resin containing at least 70% of structural units of the general formula

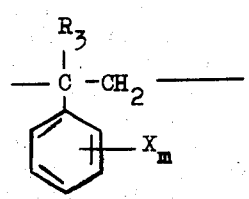

wherein $R_3$ is a hydrogen atom or a lower alkyl group, X is a halogen atom selected from chlorine and bromine, and m is zero or a positive integer of 1 or 2; and 3. 2 to 15% by weight of an aromatic polycarbonate composed of recurring units of the general formula

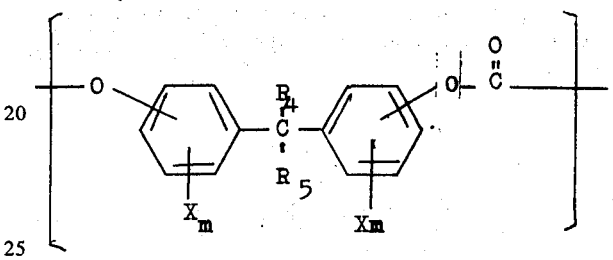

wherein $R_4$ and $R_5$ may be the same or different, and represent a hydrogen atom or a lower alkyl group, and X and m are the same as defined above; the total amount of (1), (2) and (3) being 100% by weight.

Generally, in order to improve the properties of a resin, it has been one of the most common practices to blend it with other resins. However, when different kinds of resins are mixed, the compatibility of these resins poses a problem. Especially in the case of mechanical mixing, the properties of the respective resins may frequently be lost depending upon the types of the resins, blend ratios, blending temperatures, etc., and the resulting blended composition becomes useless for practical purposes. Especially when three or more kinds of resins are mixed with each other, it is extremely difficult to predict the properties of the resulting blended resin composition.

The inventors of the present application conducted extensive work on three-component blended resins in order to obtain a thermoplastic resin composition based on polyphenylene ether and having improved processability and resistance to fatigue without impairing the properties of the polyphenylene ether. As a result, it was found that a composition comprising polyphenylene ether, a styrene resin and an aromatic polycarbonate dispersed in a specific ratio has very superior resistance to fatigue which cannot be ordinarily anticipated.

It is known to mix polyphenylene ether with an aromatic polycarbonate produced by reacting a dihydric phenol such as 2,2-bis-(4-hydroxyphenyl)-propane and a carbonate precursor such as phosgene in the presence of an acid acceptor, in order to impart resistance to cracks caused by concentrated stress and a high heat distortion temperature to the polycarbonate (see U.S. Pat. No. 3,221,080). However, this resin mixture composition has extremely poor processability, and an article obtained by fabricating this composition has poor properties on the whole as compared with those of the resin composition before fabrication. Thus, this resin mixture composition has poor feasibility as extrusion molding and injection molding materials.

A mixture of polycarbonate and polystyrene results in the reduced softening point of the polycarbonate and its increased processability, but possesses extremely poor bending properties and fatigue resistance. Other properties also become poor.

Therefore, a resin composition consisting of polycarbonate and polystyrene has poor feasibility.

It is surprising therefore that the composition of this invention has fatigue resistance 4–15 times as high as that of the polystyrene-modified polyphenylene ether and other properties same as or better than those of the latter. These excellent properties cannot be anticipated from the polycarbonate-modified polyphenylene ether or the polycarbonate/polystyrene mixed resin or the polystyrene-modified polyphenylene ether.

The polyphenylene ether used in this invention is a polymer having a structure expressed by the general formula

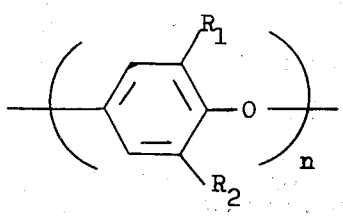

wherein $R_1$ and $R_2$ may be the same or different and represent a methyl group or an ethyl group, and n is a positive integer of at least 50. Typical examples of this polymer are poly(2,6-dimethyl-1,4-phenylene)ether, poly(2-methyl-6-ethyl-1,4-phenylene)ether, and poly(2,6-diethyl-1,4-phenylene)ether. These polyphenylene ethers are produced, for example, by the methods disclosed in U.S. Pat. Nos. 3,306,874, 3,306,875, 3,257,357 and 3,257,348.

The styrene resin used in the present invention is a polymer containing at least 70% of structural units of formula (II)

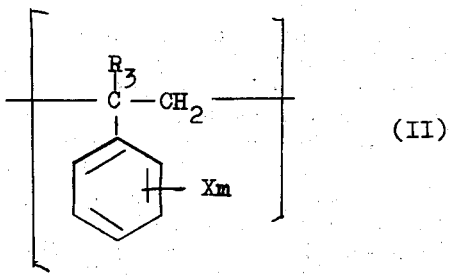

wherein $R_3$ is a hydrogen atom or a lower alkyl group, X is a halogen atom selected from chlorine and bromine, and m is zero or positive integer of 1 or 2.

By the term "styrene resin," as used in the present specification and claims, is meant not only a homopolymer of styrene, but also copolymers of styrene and copolymerizable monomers and also modified polystyrene obtained by incorporating rubber in said homopolymer or copolymers. Examples of the styrene resin that can be used in the invention are styrene homopolymers such as polystyrene, poly-α-methylstyrene or polychlorostyrene, styrene copolymers such as a styrene-acrylonitrile copolymer, a styrenebutadiene copolymer, a styrene-chlorostyrene copolymer or a chlorostyrene-bromostyrene copolymer, rubber-modified polystyrenes such as polystyrene blended with rubber, and high impact polystyrene. These styrene resins may be used alone or in admixture. Styrene resins known to those skilled in the art as high impact polystyrene can be used especially conveniently.

The aromatic polycarbonate used in this invention is a polymer having structural units expressed by formula

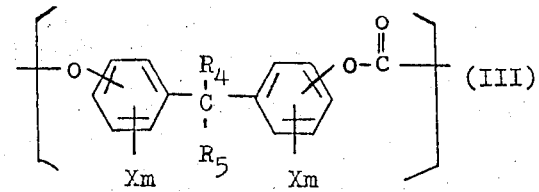

wherein $R_4$ and $R_5$ may be the same or different, and represent a hydrogen atom or a lower alkyl group, X is a halogen atom selected from chlorine and bromine, and m is zero, 1 or 2. This polymer can be produced, for example, by reacting a dihydric phenol or an alkaline salt thereof with a carbonate precursor such as phosgene, haloformate or a carbonate ester.

Examples of the dihydric phenol that can give the aromatic polycarbonate used conveniently in the present invention are 2,2-bis(4-hydroxyphenyl)propane (bisphenol A), 2,2-bis(4-hydroxyphenyl)butane (bisphenol B), 2,2-bis(4-hydroxyphenyl)pentane, 2,4'-dihydroxydiphenylmethane, bis-(2-hydroxyphenyl)methane, bis(4-hydroxyphenyl)methane, 2,2-bis(3,5-dichloro-4-hydroxyphenyl)propane, 2,2-bis(3,5-dibromo-4-hydroxyphenyl)propane, and bis(3,5-dichloro-4-hydroxyphenyl)methane. These dihydric phenols have at least two aromatic rings which are bonded to each other through an alkylene linkage, in which two hydroxyl groups are directly bonded to the carbon atoms of the separate aromatic rings. In this invention, an aromatic carbonate copolymer composed of a mixture of these dihydric phenols can also be used as an aromatic polycarbonate. A mixture of an aromatic polycarbonate and the copolymer may also be used.

The polyphenylene ether, styrene resin and aromatic polycarbonate may be mixed by a method comprising mixing solutions of them dissolved in a common, good solvent, and then coprecipitating them by addition of a precipitating agent, for example a poor solvent therefor, a method comprising mixing the powders or pellets of these components by a blender, and melt-extruding the blend through an extruder, or a method comprising kneading them by a roll.

The proportions of the resin components of the composition of this invention are: polyphenylene ether 15 – 80% by weight, preferably 35 – 70 % by weight, styrene resin 5–60% by weight, preferably 30–60% by weight, and aromatic polycarbonate 2–15% by weight, the total proportion being 100% by weight. If the proportions are outside this range, the properties of the shaped article obtained by extrusion molding or injection molding are deteriorated.

If desired, the composition of this invention may further contain a stabilizer such as alkylphenol compounds, mercaptan compounds, organic disulfide compounds, or phosphorous acid esters, a pigment (organic or inorganic), a flame-retardant such as phosphoric acid esters, halogen compounds or mixtures of these with antimony compounds, a plasticizer such as phosphates and phthalates, an ultraviolet absorbant, a lubricant, or a filler, which are conventionally used as additives for resins.

The following Examples will illustrate the present invention.

The properties of the resin compositions obtained in the following Examples were measured in accordance with the following methods.

Melt flow value

Using Koka-type flow tester (product of Shimazu Seisakusho), the polymer melted at 290°C. was extruded from a nozzle having a diameter of 1 mm and a length of 2 mm at a pressure of 60 Kg/cm$^2$, and the amount of flow per unit time was measured.

Softening point

A square test piece having a thickness of 2 mm and an area of about 1 cm$^2$ was prepared by press molding. A push needle with a load of 5 Kg/cm$^2$ was placed on this test piece, and the test piece was heated at a rate of about 3°C. per minute to make the needle penetrate into the test piece. (method in accordance with ASTM D 1525-65 T).

Heat distortion temperature

ASTM D 648. The test piece was not annealed.

Tensile strength

ASTM D 638-68 using an autograph (IS-5000 of Shimazu Seisakusho).

Elongation

ASTM D 638-68.

Impact strength

ASTM D 286, notched Izod method.

Fatigue resistance

The fatigue resistance was evaluated by the following three test methods which were all carried out at 20°C.

1. Repeated bending test

Using a bending resistance tester (MIT type, Toyo Seiki), a test piece having a width of 5 mm, a length of 110 mm and a thickness of 0.22 mm was placed under a load of 450 Kg/cm$^2$, and repeatedly bended to left and right at an angle of 135° at a rate of 175 times per minute. The number of cycles required to cause breakage of the test piece was measured.

2. Repeated tensile stress test

Using an autograph (IS-5000, Shimazu Seisakusho), a test piece (type I) described in ASTM D 638-68 was placed repeatedly under a maximum load of 630 Kg/cm$^2$ and a minimum load of 63 Kg/cm$^2$ at a cycle of 20 times per minute. The number of cycles required to cause breakage of the test piece by the variations in the load in the tensile state was measured.

3. Repeated fatigue test

Using a universal fatigue tester (UF-IS type, Shimazu Seisakusho), a test piece (S-type) described in ASTM D 1822-68 was subjected repeatedly to the reciprocal state of tension and compression at a speed of 1800 times per minute under a specific load, and the number of cycles required to cause breakage of the test piece was measured.

EXAMPLE 1

Poly(2,6-dimethyl-1,4-phenylene)ether having an inherent viscosity, as measured in chloroform at 25°C., of 0.5 dl/g and high impact polystyrene (DIAREX HT-90, registered trademark for polystyrene modified with Synthetic rubber) and poly(2,2-diphenylpropane) carbonate were dissolved in methylene chloride in the proportions indicated in Table 1. The solution was gradually added to a large excess of methanol to form a precipitate. The precipitate was recovered from the solution, and dried to form a powdery resin composition. The powders were shaped into a 0.22 mm thick film by press molding (pressure 180 Kg/cm$^2$, temperature 260° – 290°C.), and subjected to a repeated bending test. Furthermore, by press molding, a test piece having a thickness of 2 mm and an area of about 1 cm$^2$ was prepared, and the softening point was measured. The melt flow value was measured using a Koka-type flow tester as disclosed above. The results are shown in Table 1.

Table 1

| Poly-phenylene ether (parts) | Styrene resin (parts) | Aromatic poly-carbonate (parts) | Melt flow value (cc/sec.) | Tensile strength (Kg/cm$^2$) | Repeated bending test (the number of cycles) | Softening point (°C.) |
|---|---|---|---|---|---|---|
| 40 | 55 | 5 | 95 × 10$^{-3}$ | 665 | 120 | 135 |
| 40 | 50 | 10 | 82 × 10$^{-3}$ | 670 | 140 | 135 |
| 47.5 | 47.5 | 5 | — | 670 | 120 | 142 |
| 50 | 47.5 | 2.5 | 45 × 10$^{-3}$ | 661 | 100 | 141 |
| 50 | 45 | 5 | 53 × 10$^{-3}$ | 697 | 190 | 142 |
| 50 | 40 | 10 | 45 × 10$^{-3}$ | 682 | 148 | 145 |
| 55 | 35 | 10 | 55 × 10$^{-3}$ | 683 | 150 | 152 |
| 60 | 35 | 5 | 35 × 10$^{-3}$ | 687 | 125 | 157 |

It is seen from the results shown in Tables 1 and 2 that the incorporation of the aromatic polycarbonate substantially contributed to an improvement in resistance to bending fatigue. When the amount of the polyphenylene ether is relatively small, the melt flow value becomes large. Larger amounts of polyphenylene ether and aromatic polycarbonate result in a marked improvement in resistance to bending fatigue, but on the other hand, bring about a high softening point.

Comparative Example 1

Poly(2,6-dimethyl-1,4-phenylene)ether having an inherent viscosity [$\eta$]=dl/g in chloroform at 25°C. of 0.50 and high impact polystyrene (DIAREX HT-90) were dissolved in methylene chloride at proportions indicated in Table 2. The solution obtained was gradually added to a large excess of methanol to form a precipitate. The precipitate was recovered from the solution, and dried to form a powdery resin composition.

Test pieces were prepared from the powdery resin composition obtained in the same way as in Example 1, and the various physical properties were measured. The results are given in Table 2.

Table 2

| Poly-phenylene ether (parts) | Styrene resin (parts) | Melt flow value (cc/sec.) | Tensile strength (Kg/cm$^2$) | Repeated bending test (times) | Softening point (°C.) |
| --- | --- | --- | --- | --- | --- |
| 0 | 100 | — | — | 0 | — |
| 25 | 75 | 220×10$^{-3}$ | 495 | 25 | — |
| 50 | 50 | 65×10$^{-3}$ | 609 | 40 | 136 |
| 75 | 25 | 13×10$^{-3}$ | 755 | 50 | 164 |
| 100 | 0 | 2.3×10$^{-3}$ | — | 55 | 198 |
| Noryl SE-1 | | | 563 | 62 | 121 |
| Noryl 731 | | | 591 | 38 | 118 |

"Noryl" is a registered trademark for polyphenylene ether resins, and Noryl SE-1 and Noryl 731 represent a styrene-modified polyphenylene ether.

It is seen from the results of Table 2 that the polystyrene-modified polyphenylene ethers (Noryl SE-1 and Noryl 731) and the resin composition obtained by blending polyphenylene ether and high impact polystyrene are both inferior in resistance to bending fatigue.

EXAMPLE 2

The same polyphenylene ether, styrene resin and aromatic polycarbonate as those used in Example 1 were used in a ratio of 47.5 : 47.5 : 5 (parts by weight). These compounds were mixed by a blender, and further 2 parts of 2-mercaptobenzothiazole zinc salt as a heat stabilizer and 1.5 parts of titanium oxide were added to mix them thoroughly. The powdery mixture obtained was melt kneaded and extruded using a biaxial extruder, and pelletized. The pellets were injection-molded at a pressure of 1320 Kg/cm$^2$ with the temperatures of the cylinder and the mold being maintained at 260°–280°C. and 90°C., respectively, to form test pieces. These molded products had a tensile strength of 665 Kg/cm$^2$, and elongation of 35%, an Izod impact strength (notched) of 9 Kg.cm/cm, and a heat distortion temperature (18.4 Kg/cm$^2$, not annealed) of 130°C. In the repeated tensile stress test, the test piece was not broken even after 1200 cycles.

Noryl SE-1 used in a Reference Example was injection molded under the same conditions as above to form test pieces. The properties of these test pieces were measured, and it was found that this molded product had a tensile strength of 600 Kg/cm$^2$, an elongation 21.1%, an Izod impact strength of 11 Kg.cm/cm, and a heat distortion temperature of 121°C. In the repeated tensile stress test, it was broken after 100 – 300 cycles.

It is seen from the above results that the resin composition of this invention has mechanical strength and thermal properties equivalent to those of Noryl SE-1, and superior properties in repeated tensile stress test, showing a marked improvement in fatigue resistance.

EXAMPLE 3

50 Parts of poly (2,6-dimethyl-1,4-phenylene)-ether having an inherent viscosity, as measured in chloroform at 25°C., of 0.48, 47.5 parts of pellets of high impact polystyrene (DIAREX HT-190) and 2.5 parts of poly(2,2-diphenylpropane) carbonate were mixed, and 2 parts of 2-mercaptobenzothiazole zinc salt as a heat stabilizer and 1.5 parts of titanium dioxide were further mixed using a blender. The mixture obtained was melt-kneaded and extruded using an extruder, and pelletized. The pellets were shaped in the test pieces using an injection molder at an injection pressure of 1320 Kg/cm$^2$ with the temperatures of the cylinder and the die being maintained at 260° – 270°C. and 90°C, respectively. The molded article had a tensile strength of 670 Kg/cm$^2$, an elongation of 32%, an Izod impact strength of 13.0 Kg.cm/cm, and a heat distortion temperature of 126°C. When the molded article was tested as to repeated fatigue, it was not yet broken after 5.33 million cycles.

When an injection molded article obtained from Noryl SE-1 used in a Reference Example, under the same conditions as mentioned above, was subjected to the same repeated fatigue test as mentioned above, it was broken after 430,000 cycles.

It is seen from the above results that the resin composition of this invention exhibited excellent performance in the repeated fatigue test in which tension and compression were reciprocally repeated, thus showing excellent resistance to fatigue.

EXAMPLE 4

50 Parts of polyphenylene ether (same as that used in Example 3), 47.5 parts of styrene resin (same as that used in Example 3), and 2.5 parts of an aromatic carbonate copolymer derived from bisphenol A and nuclearly tetrabromated bisphenol A were mixed in a powder state with one another, and test pieces were prepared from the mixture by the same procedure as set forth in Example 2. The test pieces had a tensile strength of 665 Kg/cm$^2$, an Izod impact strength of 9.5 Kg.cm/cm, an elongation of 32% and a heat distortion temperature of 125°C. In the repeated fatigue test under a load of 130 Kg/cm$^2$, the test piece was not broken after 5 million cycles. In the repeated tensile stress test, it was not broken after 1100 cycles. In the repeated bending test, it was broken after 100 cycles.

EXAMPLE 5

80 Parts of poly(2,6-dimethyl-1,4-phenylene)ether (an intrinsic viscosity, measured in a chloroform solution at 25°C., of 0.48), 17.5 parts of high impact polystyrene (DIAREX HT-190) and 2.5 parts of poly(2,2-diphenylpropane) carbonate were mixed with each other. Further, 0.5 part of 2-mercaptobenzothiazole zinc salt as a heat stabilizer and 5.0 parts of titanium oxide were added, and these compounds were sufficiently mixed by a blender. The resulting mixture was melted and kneaded, and extruded using an extruder to form pellets. The pellets were molded in the same way as in Example 3 to form test pieces. The test pieces had a tensile strength of 773 Kg/cm$^2$, an elongation of 31%, an Izod impact strength (notched) of 6.2 Kg.cm/cm, and a heat distortion temperature of (18.4 Kg/cm$^2$, no annealing) of 167°C. Under a load of 180 Kg/cm$^2$, the test pieces broke after more than 2 million cycles in a tensile fatigue test, after more than 1,000 cycles in a repeated tensile test, and after 100 cycles in a repeated bending test.

The above procedure was repeated except that the amounts of the poly(2,6-dimethyl-1,4-phenylene) ether and the high impact polystyrene were changed to 80 parts and 20 parts, respectively, and the polycarbonate was not mixed. The molded article broke after 220,000 cycles in a tensile fatigue test, and after 150 cycles in a repeated tensile test.

EXAMPLE 6

68 Parts of poly(2,6-diethyl-1,4-phenylene)ether, having an inherent viscosity, as measured in chloroform at 25°C., of 0.48, 30 parts of styrene resin (same as that used in Example 3), and 2 parts of aromatic polycarbonate (same as that used in Example 3) were mixed in the powdery state and by the same procedure as set forth in Example 2, test pieces were prepared. These test pieces had a tensile strength of 730 Kg/cm$^2$, and Izod impact strength of 9.0 Kg.cm/cm, a heat distortion temperature of 153°C., and an elongation of 20%. The test piece was broken after 2.5 million cycles in a repeated fatigue test under a load of 130 Kg/cm$^2$, after 950 cycles in a repeated tensile stress test, and after 95 cycles in a repeated bending test.

On the other hand, a molded product produced from a powder mixture of 68 parts of poly(2,6-diethyl-1,4-phenylene)ether and 32 parts of styrene resin was broken after 570,000 cycles in the repeated fatigue test, after 210 cycles in the repeated tensile stress test, and after 65 cycles in the repeated bending test.

EXAMPLES 7 TO 11

50 Parts of polyphenylene ether (same as that used in Example 3), 5 parts of aromatic polycarbonate (same as that used in Example 3), and 45 parts of a styrene resin indicated below were mixed in the powdery state, and test pieces were prepared from the mixture in the same way as set forth in Example 2. Various properties of the test pieces were measured, and the results obtained are shown in Table 3.

EXAMPLE 7 a copolymer of chlorostyrene and bromostyrene in a weight ratio of 75:25 having impact resistance.

EXAMPLE 8 a blend of polystyrene and polybutadiene in a weight ratio of 6:4.

EXAMPLE 9 a blend of ordinary polystyrene (DIAREX HF-77, registered trademark) and high impact polystyrene (ESBRITE-800, registered trademark) in a ratio of 15:30.

EXAMPLE 10 a blend of ordinary polychlorostyrene and high impact polystyrene (ESBRITE-800, registered trademark) in a ratio of 10:35.

EXAMPLE 11 an acrylonitrole/styrene copolymer (TYRIL-783, registered trademark).

EXAMPLE 12

The procedure of Example 9 was repeated except that a polycarbonate derived from bisphenol B was used instead of the polycarbonate from bisphenol A. The physical properties of an article molded from the resulting composition are shown in Table 3.

Table 3

| | Properties | | | | Fatigue resistance | | |
|---|---|---|---|---|---|---|---|
| Example Nos. | Tensile strength (Kg.cm$^2$) | Elongation(%) | Izod impact strength (Kg.cm/cm) | Heat distortion temperature (°C.) | Repeated fatigue test (number of cycles) | Repeated tensile stress test (number of cycles) | Repeated bending test (number of cycles) |
| 7 | 685 | 24 | 10 | 133 | 4.5 million | 950 | 105 |
| 8 | 430 | 41 | 31 | 118 | 3 million* | — | — |
| 9 | 670 | 33 | 10 | 128 | more than 5 million | more than 1000 | 120 |
| 10 | 665 | 32 | 9.4 | 128 | 4.2 million | more than 1000 | 106 |
| 11 | — | — | — | 135** | — | — | 120 |
| 12 | — | — | — | 123 | more than 5 million | more than 1000 | — |

*Value under a load of 160 Kg/cm$^2$. In other Examples, the repeated fatigue test was conducted under a load of 130 Kg/cm$^2$.
**This shows the softening point.

COMPARATIVE EXAMPLE 2

Poly (2,6-dimethyl-1,4-phenylene) ether having an intrinsic viscosity, measured in a chloroform solution at 25°C., of 0.50 dl/g and poly (2,2-diphenylpropane) carbonate were mixed in the proportions shown in Table 4. The resulting mixture was extruded using a biaxial extruder to form pellets. The pellets were molded by an injection-molding machine at 340° to 360°C. to form test pieces.

The above procedure was repeated except that polyphenylene ether having an intrinsic viscosity of 0.40 dl/g was used in the proportion shown in Table 4, and the molding temperature was lowered.

The properties of the resulting test pieces were measured, and the results are shown in Table 4. In the table, the fatigue limit denotes the maximum load under which the test piece does not break after repeated tension and compression for 10$^6$ times at a speed of 1800 times per minute in the repeated fatigue test.

Table 4

| | Raw material | Raw material | Composition 1 | Raw material | Composition 2 |
|---|---|---|---|---|---|
| Viscosity of polyphenylene ether | — | 0.50 | | 0.40 | |
| Polycarbonate (wt%) | 100 | 0 | 35 | 0 | 35 |
| Polyphenylene ether (wt%) | 0 | 100 | 65 | 100 | 65 |
| Injection molding temperature (°C) | 280 | 360 | 340 | 330 | 300 |
| Fatigue limit (Kg/cm$^2$) | 150 | 125 | 110 | 101 | 95 |
| Izod impact strength (Kg.cm/cm) | 75.3 | 4.4 | 2.0 | 2.0 | 1.5 |
| Elongation (%) | 70–100 | 27.0 | less than 6 (broken) | 35.9 | less than 6 (broken) |

It is seen from Table 4 that the composition consisting of polyphenylene ether and polycarbonate has poor moldability, and when the viscosity of the polyphenylene ether is 0.50, it should be injection-molded at a temperature above the heat decomposition temperature (330°C.) of the polyphenylene ether. If the viscosity of the polyphenylene ether is reduced, the molding of the composition can be performed at a lower temperature. However, in both of these cases, the molded products did not show any improvement resulting from the blending, but had poor feasibility.

On the other hand, the composition in accordance with this invention consisting of 50% by weight of polyphenylene ether (the same material as the composition 1), 5% by weight of polycarbonate (the same material as composition 1), and 45% by weight of high impact polystyrene (STYRON-492, tradename for the product produced by Asahi Dow) could be injection molded at 280°C., and the test pieces had a fatigue limit of 190 Kg/cm$^2$, an Izod impact strength of 14 Kg.cm/cm, and an elongation of 30%.

COMPARATIVE EXAMPLE 3

High impact polystyrene (STYRON-492) and poly (2,2-diphenylpropane) carbonate were mixed, and the mixture was extruded using a biaxial extruder to form pellets. The pellets were molded by an injection molding machine to form test pieces. The various properties of the resulting test pieces were measured. The results are shown in Table 5.

Table 5

| | Raw material | Composition | Raw material |
|---|---|---|---|
| Polycarbonate (wt.%) | 0 | 20 | 100 |
| Polystyrene (wt.%) | 100 | 80 | 0 |
| Injection molding temperature (°C) | 230 | 280 | |
| Fatigue limit (Kg/cm$^2$) | 130 | 112 | 150 |
| Izod impact strength (Kg. cm/cm) | 6.8 | 1.5 | 75.3 |
| Elongation (%) | 38.4 | 6.5 | 70–100 |

It is clear from the results shown in Table 5 that when polycarbonate is blended with polystyrene, its properties are deteriorated, and inferior to those of the polystyrene alone or the polycarbonate alone. This blend therefore has poor feasibility.

What we claim is:

1. A thermoplastic blended resin composition comprising the following resin components:
   1. 15 to 80% by weight of a polyphenylene ether having a polymer unit of the general formula

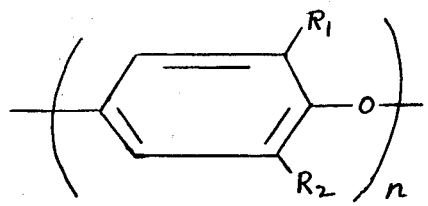

wherein $R_1$ and $R_2$ may be in the same or different and represent a methyl or ethyl group and n is a positive integer of at least 50;
   2. 5 to 60% by weight of a styrene resin of at least one member selected from the group consisting of styrene homopolymers, styrene copolymers, rubber-modified polystyrenes and high impact polystyrenes and containing at least 70% of structural units of the general formula

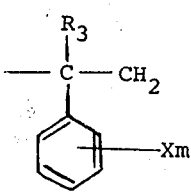

wherein $R_3$ is a hydrogen atom or lower alkyl group, X is a halogen atom selected from chlorine and bromine, and m is zero or integer of 1 or 2; and
   3. 2–15% by weight of an aromatic polycarbonate composed of recuring units of the general formula

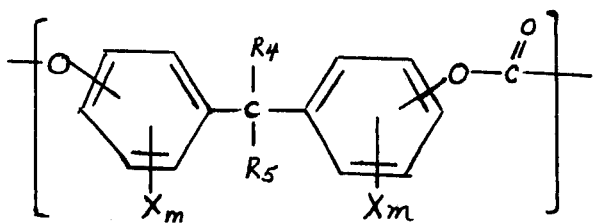

wherein $R_4$ and $R_5$ may be the same or different, and represent a hydrogen atom or a lower alkyl group, and X and m are the same as defined above; the total amount of (1), (2) and (3) being 100% by weight based on the total weight of the resin.

2. The composition of claim 1 wherein said polyphenylene ether is selected from the group consisting of poly(2,6-dimethyl-1,4-phenylene)ether and poly(2,6-diethyl-1,4-phenylene)ether, said aromatic polycarbonate is derived from a bisphenol selected from the group consisting of bisphenol A, bisphenol B and nuclearly halogenated bisphenols A, and said styrene resin is at least one member selected from the group consisting of styrene homopolymers, styrene copolymers, rubber-modified polystyrenes and high impact polystyrene.

3. The composition of claim 1, wherein said aromatic polycarbonate is a carbonate copolymer derived from a mixture of bisphenol A and nuclearly brominated bisphenol A.

4. The composition of claim 1, wherein said styrene resin includes halogenated polystyrene.

5. The composition of claim 2, wherein said styrene resin is a rubber-modified polystyrene consisting of a mixture of polybutadiene and polystyrene.

6. The composition of claim 2, wherein said styrene resin is a styrene copolymer.

7. The composition of claim 6, wherein said styrene copolymer is a styrene-acrylonitrile copolymer or a styrene-butadiene copolymer.

* * * * *